No. 612,027. Patented Oct. 11, 1898.
C. G. FERRIS.
BEESWAX EXTRACTOR.
(Application filed Dec. 24, 1897.)

(No Model.)

WITNESSES
Rich. A. George
Phebe A. Tanner

INVENTOR.
CHARLES G. FERRIS.
By Milton E. Robinson
ATTORNEY.

UNITED STATES PATENT OFFICE.

CHARLES G. FERRIS, OF SOUTH COLUMBIA, NEW YORK.

BEESWAX-EXTRACTOR.

SPECIFICATION forming part of Letters Patent No. 612,027, dated October 11, 1898.

Application filed December 24, 1897. Serial No. 663,303. (No model.)

*To all whom it may concern:*

Be it known that I, CHARLES G. FERRIS, of South Columbia, in the county of Herkimer and State of New York, have invented certain new and useful Improvements in Beeswax-Extractors; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

Figure 1:
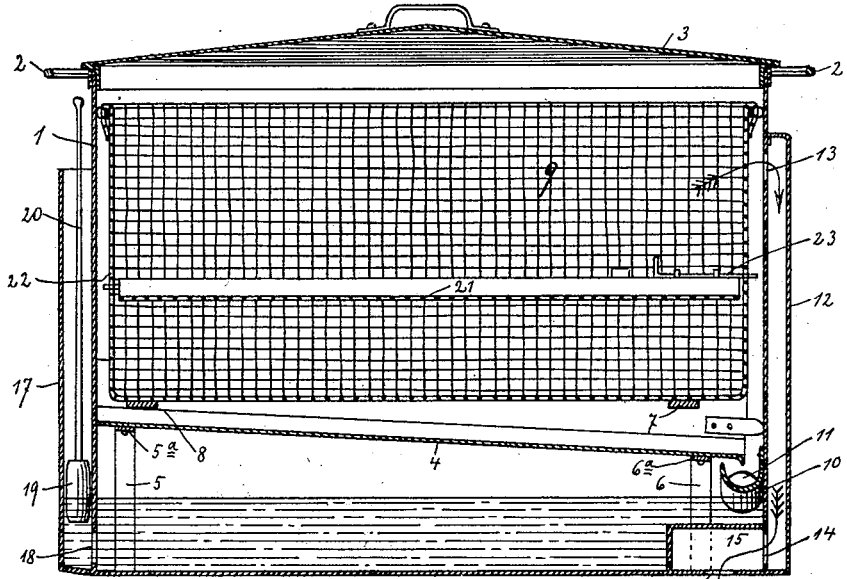
Figures 2, 3:
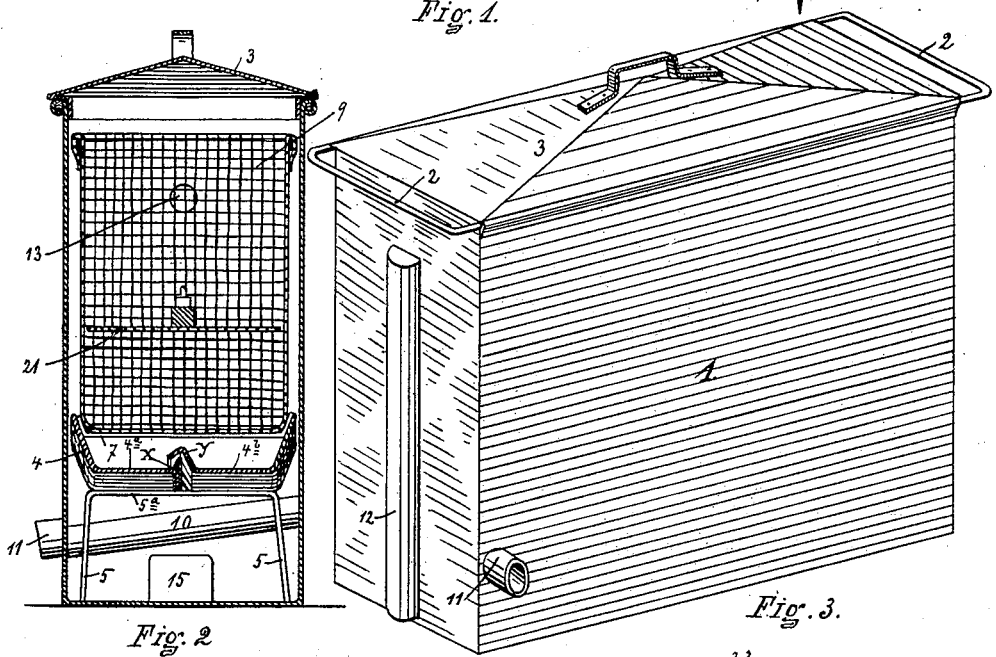
Figure 4:
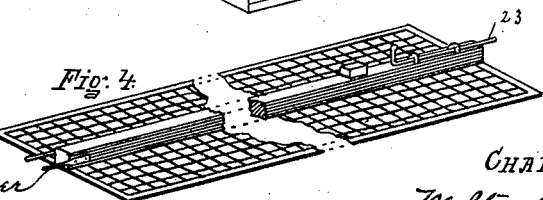

In the drawings, Figure 1 shows a longitudinal vertical section of my beeswax-extractor. Fig. 2 shows a vertical cross-section of the device. Fig. 3 shows a perspective view. Fig. 4 shows a perspective view of a comb-refuse-holding rack.

Referring to the reference letters and figures in a more particular description of the device, 1 indicates the body or casing of the device, which, as shown, is of rectangular form, having a flat bottom adapted to set upon the top of a stove. The casing is provided with handles 2 2 at either end thereof, as shown, and a cover 3 fitting the top of the receptacle tightly. Within the casing is adapted to be received the inclined drip-pan or separator 4, which is supported by legs 5 6 at either end. The body portion of the drip-pan is formed of two parts 4ª and 4ᵇ, the parts being rigidly secured to the bridge-pieces 5ª and 6ª, respectively, extending between the pairs of legs 5 and 6. The inner meeting edge of the part 4ª is provided with an upwardly-turning lip $x$, while the meeting edge of the part 4ᵇ is formed with an inverted-V-shaped edge $y$. These meeting edges are separated, as shown, whereby a free circulation for steam is provided through the middle of the drip or separator pan 4. The separator-pan is provided on top with supporting-bars 7 and 8, on which rests the perforate basket 9. The lower end of the drip-pan or separator 4 overhangs an inclined trough 10, secured on one end of the case or body, and communicates with the discharge-opening 11. At one end the casing is provided with a vertical tube or flue 12, closed at the upper and lower ends and putting in communication the opening 13 in the wall adjacent to the top of the body or case and the opening 14 in the wall at the bottom of the case. Within the case there is provided a small casing or box 15, which incloses the opening 14 and the opening 16 in the bottom of the case. On the other end of the body there is provided an external tube 17, open at its upper end and closed at its lower end and placed in communication with the interior of the body by a hole or opening 18. This tube 17 contains a float 19, having a projecting stem 20, adapted to project above the open end of the tube 17 and indicate the amount of water contained in the bottom of the casing. There is also provided for use in the basket 9 a comb-refuse-holding rack or frame 21, having fixed projections 22 on one end adapted to enter the mesh of the basket at one end and a sliding catch 23 on the other end also adapted, when projected, to enter the mesh of the basket.

The operation of the device is substantially as follows: The body or case is set on the stove with the lid removed and the end having the opening 16 over the open lid. The case is then filled with water, preferably until it flows out of the spout 11. In filling the bottom with water the float 19 is raised, as shown in Fig. 1, and the upper end of the spindle or point 20 is raised above the upper end of the tube 17, showing the quantity of water contained in the body or receptacle, the wax-combs are placed in the basket 21, and the cover 3 is applied. In the first part of the operation the holding-down rack or frame 21 is omitted. The device being heated, steam is generated, which circulates particularly through the opening in the drip-pan or separator and is disseminated through the comb contained in the basket, and the heat melts the comb, which drips onto the drip-pan or separator 4 and is conducted thence into the trough 10 and thence through the discharge-opening 11. To the discharge-opening 11 may be attached a tube conducting the melted wax into a suitable receptacle. The inclination of the drip-pan or separator 4 is such that any particles of foreign matter which may fall will rest on the pan and not float into the trough 10. The foul odors and surplus steam are taken from the interior of the receptacle through the opening 13, down the flue 12 through the opening 14, the boxing 15, and the opening 16 into the stove, where they are passed off through the regular smoke-flue. When the wax has ceased to flow under the operation of the device, as before stated, the cover 3 is then removed and the holding down rack or frame 21 is placed in position within the basket, as shown, compressing the remainder of the comb-refuse and what foreign matter there may be with it into the bottom of the basket. In this operation the projections 22 are engaged in the mesh of the wire basket at one end and the sliding catch 23, after the frame is gotten into proper position, is engaged in the other end of the basket by sliding it out into the position shown in Figs. 1 and 4. The opening 11 is then plugged or corked and the device is filled nearly full of water, or to a point somewhat above the top of the rack or frame 21. The cover is then replaced and further heat is applied, when the remainder of the wax in the mass below the frame 21 is boiled out and floats on the surface of the water, where it may be skimmed off when the application of heat has ceased.

The receptacle 1 may be made of a size to receive two or more baskets similar to 9 side by side, and in which case a drip-pan or separator may be provided for each basket independently or a single pan for all the baskets.

Modifications and changes may be made without departing from the spirit of my invention.

What I claim as new, and desire to secure by Letters Patent, is—

1. The combination in a beeswax-extractor of the closed body or receptacle, a removable inclined drip-pan or separator supported in the receptable above the bottom, a trough secured in one end of the receptacle into which the drip-pan or separator discharges, and a removable basket supported in the upper portion of the receptacle, substantially as set forth.

2. The combination in a beeswax-extractor of the closed body or receptacle, a removable inclined drip-pan or separator supported in the receptacle above the bottom, a trough secured in one end of the receptacle above the bottom and in position to receive the discharge from the drip-pan, and having a discharge-opening through the side of the receptacle above the bottom and a basket supported in the receptacle above the drip-pan, substantially as set forth.

3. The combination in a beeswax-extractor of a body or receptacle, an inclined removable drip-pan supported in the receptacle above the bottom, and having a drip-protected passage-way or opening through the drip-pan, a trough secured in one end of the receptacle in position to receive the discharge from the drip-pan, and having a discharge-opening through the side of the receptacle above the bottom, and a basket supported in the receptacle above the drip-pan, substantially as set forth.

4. The combination in a beeswax-extractor of a main receptacle, an inclined, removable drip-pan supported in the receptacle above the bottom, a trough secured in one end of the receptacle in position to receive the drip from the drip-pan, and having a discharge-opening through the side of the receptacle above the bottom, a basket supported above the drip-pan in the receptacle, and a removable rack or frame adapted to be placed in the basket and having means for securing it to the basket, substantially as set forth.

In witness whereof I have affixed my signature, in presence of two witnesses, this 18th day of December, 1897.

CHARLES G. FERRIS.

Witnesses:
PHEBE A. TANNER,
DWIGHT H. COLEGROVE.